United States Patent [19]

Nomura

[11] Patent Number: 5,257,864
[45] Date of Patent: Nov. 2, 1993

[54] TEMPERATURE DETECTOR

[75] Inventor: Yasuhisa Nomura, Tokushima, Japan

[73] Assignee: Hamanishi Sangyo Company, Shizuoka, Japan

[21] Appl. No.: 829,063

[22] PCT Filed: Aug. 14, 1990

[86] PCT No.: PCT/JP90/01033
 § 371 Date: Feb. 10, 1992
 § 102(e) Date: Feb. 10, 1992

[87] PCT Pub. No.: WO91/02956
 PCT Pub. Date: Mar. 7, 1991

[30] Foreign Application Priority Data

Aug. 19, 1989 [JP] Japan .................. 1-214002

[51] Int. Cl.[5] .................. G01K 7/22; G01K 7/34
[52] U.S. Cl. .................. 374/163; 374/183; 374/184
[58] Field of Search .................. 374/163, 183, 184

[56] References Cited

U.S. PATENT DOCUMENTS 4,078,201 3/1978 Buser .................. 374/163
4,635,055 1/1987 Fernandes et al. .................. 374/152

FOREIGN PATENT DOCUMENTS 0125533 7/1985 Japan .................. 374/163

Primary Examiner—William A. Cuchlinski, Jr.
Assistant Examiner—Diego F. F. Gutierrez
Attorney, Agent, or Firm—Birch, Stewart, Kolasch & Birch

[57] ABSTRACT

Zero-cross points of an ac voltage waveform (v) applied to a heat-sensitive wire (1) and an ac current waveform (i) flowing into the heat-sensitive wire (1) are detected by a zero voltage detection unit (3) and a zero current detection unit (4), and the interval between the zero-cross points of voltage and current is measured by a measuring unit (7). The measured interval corresponds to the phase angle ($\phi$) between the voltage and current waveforms, and the phase angle ($\phi$) depends on the specific resistance ($\rho$) and permitivity ($\epsilon$) of the heat-sensitive wire (1). This relation is utilized for temperature measurement. The relation between the phase angle ($\phi$) and the specific resistance ($\rho$) and permitivity ($\epsilon$) is independent of the size of the heat-sensitive wire. Therefore, the temperature can be correctly measured even when the wire is made of a material which is not rigid enough to keep its size constant.

9 Claims, 2 Drawing Sheets

TEMPERATURE DETECTOR

TECHNICAL FIELD

The present invention relates to a temperature detector using a heat-sensitive wire as a temperature measuring element.

DESCRIPTION OF THE BACKGROUND ART

A heat-sensitive wire is obtained such that a thermistor made of a polymer compound is buried between coaxial internal and external conductors, and they are drawn to have a linear shape. In this heat-sensitive wire, an impedance between the conductors is varied according to a temperature. The impedance is low at a high temperature, and the impedance is high at a low temperature. A temperature detector is formed using the above characteristics of the heat-sensitive wire.

The impedance of the heat-sensitive wire is mainly constituted by a resistance component obtained by moving ions contained in a polymer compound and an electrostatic capacitance between the conductors. When the heat-sensitive wire is used as a temperature measuring element, an error occurs in a measurement value due to localization of ions or charge accuraulation in a capacitor, and the degradation of the heat-sensitive wire is accelerated. For this reasons, an ac voltage having symmetrical positive and negative components must be applied to the heat-sensitive wire, and a commercial power source having a sine wave is conventionally used to measure the impedance. For example, the following method is described in Japanese Patent Laid-Open No. 59-44803. That is, an ac voltage is applied to a temperature detecting wire, and temperature detection is performed by the magnitude of the impedance of the temperature detecting wire to control a heating power.

An impedance z of the heat-sensitive wire can be represented by a vector. When the above arrangement is regarded as a series equivalent circuit, assuming that the angular velocity of a power source frequency is represented by ω; a resistance component, R; and an electrostatic capacitance, C, the impedance Z can be represented by the following equation:

$$Z = R + \frac{1}{j\omega C} \quad (1)$$

In this equation, R and C of the right-hand side are changed in accordance with a temperature. As a result, Z of the left-hand side has a value corresponding to the temperature.

Although the heat-sensitive wire has also an inductance component as a matter of course, when the heat-sensitive wire has a practical length (several meters to several tens of meters), the magnitude of the inductance component is smaller than that of the resistor component or the electrostatic capacitance enough to be negligible. Therefore, the inductance component is omitted in equation (1).

An absolute value $|Z|$ of the impedance Z is calculated by equation (1) as follows:

$$|Z| = \frac{\sqrt{1 + \omega^2 C^2 R^2}}{\omega C} \quad (2)$$

In a conventional temperature detector of this type, a temperature is detected by the following means. That is, the impedance of a heat-sensitive wire is calculated as the absolute value $|Z|$, and an absolute value $|I|$ of a current I obtained by applying a voltage E to the heat-sensitive wire is calculated. A voltage obtained by causing the current I to flow into the heat-sensitive wire directly or through a resistor having a known resistance is converted into a dc voltage, and the current or voltage is compared with a dc reference current or voltage obtained independently of the measured voltage or current.

The impedance of the heat-sensitive wire will be described below in detail.

The section of the heat-sensitive wire is shown in FIG. 1. Assume that the length of a heat-sensitive wire 1 is represented by L; the outer radius of an internal conductor 101, a; the inner radius of an external conductor 102, b,; the specific resistance of a polymer compound 103, ρ; and a permitivity, ε, and assume that a terminal effect is neglected. In this case, a resistance component R and an electrostatic capacitance C are obtained by the following equations:

$$R = \frac{1}{L} \times \frac{\rho}{2\pi} \log \frac{b}{a} \quad (3)$$

$$C = \frac{L \times 2\pi\varepsilon}{\log \frac{b}{a}} \quad (4)$$

On the other hand, when the heat-sensitive wire is applied to an electric blanket or the like, the flexibility of it is an important property. The internal conductor 101 is obtained by winding a thin wire or a conductive ribbon around a core made of synthetic fibers, and the external conductor 102 has the same structure as that of the internal conductor 101. Therefore, the outer radius a and the inner radius b of the conductors cannot be easily processed with high dimensional precision in the manufacturing process, and the impedance Z and its absolute value $|Z|$ represented by equations (1) and (2) obtained as results of the resistance component R and the electrostatic capacitance C represented by equations (3) and (4) are considerably varied. For example, when the length L is 5 m, a precision of ±30% is obtained, and even when the length is 10 m, only a precision of ±20% is obtained. For this reason, in practical use, after the heat sensitive wire is cut to have a predetermined length, the cut wire is discriminated, or the cut wire is connected to a detector to determine whether the cut wire is proper in practice.

In Japanese Patent Laid-Open No. 60-125533, the following method is described. That is, a temperature is measured by a relationship between the magnitude of a current supplied to a power cable and the phase difference between a voltage applied to the power cable and the current. When this measuring method is applied to a heat-sensitive wire, since the phase difference between the voltage and the current is defined by the specific resistance permitivity of a thermistor material independently of the size of the heat-sensitive wire, temperature detection can be accurately performed regardless of the dimensional precision of the heat-sensitive wire. A measuring method in which the phase difference between the voltage and the current is detected by detecting an interval between zero-cross points of each waveform is disclosed, in e.g., Japanese Patent Laid-Open No. 51-3275.

However, extensive studies of the present inventor found that it was very important to apply an ac voltage having symmetrical positive and negative components to the heat-sensitive wire, and that even when a slight unbalanced component was present, a measurement error occurred, or the thermistor material of the heat-sensitive wire was degraded to increase the measurement error. In relation to this point, it was found that in the well-known method (for example, Japanese Patent Laid-Open No. 54-136877) in which the phases of an ac waveform were detected by detecting zero-cross points of the waveform, the occurrence of the unbalanced component could not be completely eliminated.

SUMMARY OF THE INVENTION

It is a principal of the present invention to provide an apparatus capable of solving the above problems and performing correct temperature detection regardless of the dimensional precision of a heat-sensitive wire.

It is an object of the present invention to prevent occurrence of an unbalanced component in an ac waveform applied to a heat-sensitive wire to decrease a measurement error so as to prevent the degradation of the heat-sensitive wire.

It is another object of the present invention to obtain a highly accurate temperature measurement value using a flexible heat-sensitive wire which is susceptible to variations in dimensional precision.

It is still another object of the present invention to achieve the principal by digital processing.

It is still another object of the present invention to achieve the principal by analog processing.

It is still another object of the present invention to provide a measuring circuit capable of easily performing especially digital processing.

It is still another object of the present invention to obtain a temperature measurement value when temperature measurement is performed by an ac voltage without any influence of the frequency of the ac voltage.

According to the present invention, there is provided a temperature detector comprising zero voltage detecting means, connected in parallel to the heat-sensitive wire, for detecting zero-cross points of an ac voltage waveform applied to a heat-sensitive wire, zero current detecting means, connected in series with the heat-sensitive wire, for detecting zero-cross points of an ac current waveform flowing into the heat-sensitive wire, and interval measuring means for receiving outputs from the zero voltage detecting means and the zero current detecting means to measure an interval between the zero-cross points of the voltage waveform and the current waveform, wherein the zero current detecting means has at least the same impedances of the positive and negative components of the ac waveform to prevent generation of an unbalanced component in an ac current waveform flowing across both the conductors, and a temperature measurement value is obtained from an output from the interval measuring means.

That is, when equation (1) is rewritten using equation (2), the following equation can be obtained:

$$Z = |Z|\cos\phi - j|Z|\sin\phi \qquad (5)$$

$$\phi = \tan^{-1}\frac{1}{\omega CR} \qquad (6)$$

Although the derivation process for these equations will be omitted, equations (5) and (6) are obviously obtained by the following equations:

$$\cos\phi = \frac{\frac{R}{\sqrt{1+\omega^2 C^2 R^2}}}{\omega C}, \sin\phi = \frac{\frac{1/\omega C}{\sqrt{1+\omega^2 C^2 R^2}}}{\omega C}$$

$$\tan\phi = \frac{\sin\phi}{\cos\phi} = \frac{1}{\omega CR}$$

In addition, substitutions of equations (3) and (4) into equation (6) yield the following equation:

$$\phi = \tan^{-1}\frac{1}{\omega \times \frac{L \cdot 2\pi\epsilon}{\log(b/a)} \times \frac{\rho}{2\pi L}\log(b/a)} \qquad (7)$$

$$= \tan^{-1}\frac{1}{\omega\epsilon\rho}$$

In this case, the specific resistance $\rho$ and the permitivity $\epsilon$ of the polymer compound 103 are constants respectively determined by the physical properties of the polymer compound itself regardless of the size of the heat-sensitive wire, and the angular velocity $\omega$ is a constant determined by the frequency of a power source. Therefore, $\phi$ represented in equation (7) has a numerical value which is independent of the size of the heat-sensitive wire, and the numerical value corresponds to a temperature.

On the other hand, $\phi$ corresponds to a voltage vector E applied to the heat-sensitive wire and the phase angle of a current vector I flowing into the heat-sensitive wire at the time of application of the voltage E. For this reason, when the phase angle $\phi$ is measured, highly accurate temperature detection can be performed regardless of the dimensional precision of the heat-sensitive wire.

The phase angle $\phi$ can be measured with high accuracy by measuring an interval between the zero-cross points of a current waveform and a voltage waveform. This interval measurement is completed preferably based on digital processing performed by counting clock pulses. In addition, an interval measurement value can be output as an analog amount.

According to one aspect of the present invention, a heat-sensitive wire is obtained as follows. That is , a thermistor made of a polymer compound is buried between coaxial internal and external conductors, and they are drawn to have a linear shape. Since a specific resistance $\rho$ and a permitivity $\epsilon$ of the polymer compound constituting the thermistor are changed with a temperature, the temperature can be calculated from a phase angle $\phi$ on the basis of equation (7).

According to a preferred aspect of the present invention, a means for measuring the angular frequency $\omega$ in equation (7) is provided to remove the influence of a change in measurement frequency.

According to another aspect of the present invention, a pulse generating circuit is used as a means for detecting zero current and voltage waveforms, thereby easily performing digital processing using, e.g., a microprocessor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

The present invention will be described below with reference to the accompanying drawings.

Figure 2:
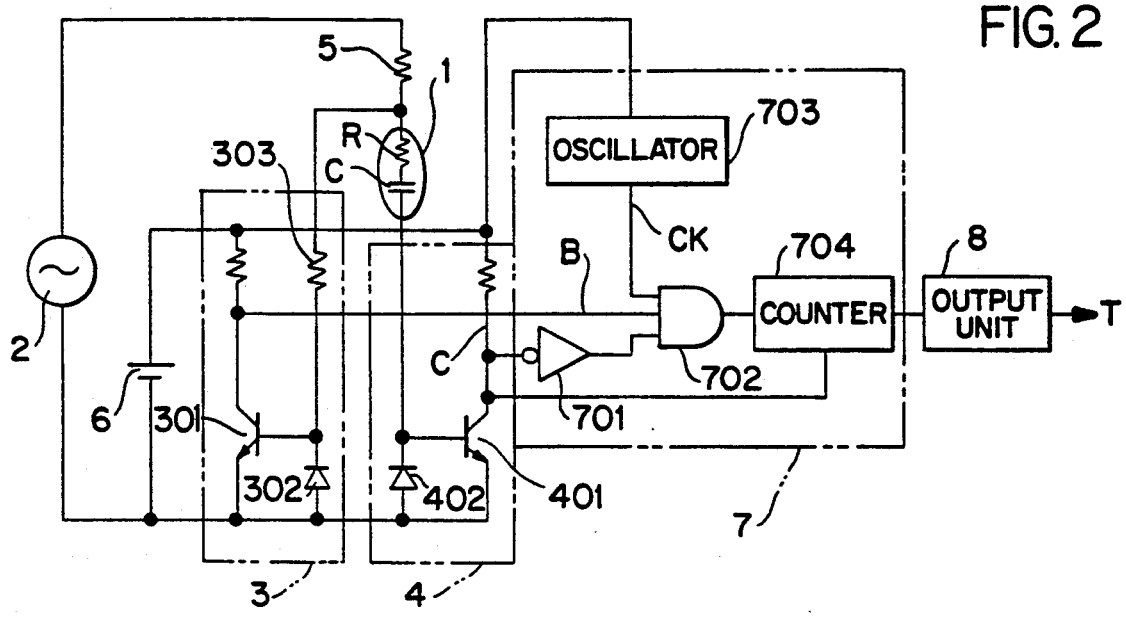
FIG. 2 is a circuit diagram showing a temperature detector according to an embodiment of the present invention.

FIG. 2 shows a temperature detector according to an embodiment of the present invention. In this temperature detector, an ac power source 2 is applied to a heat-sensitive wire 1 through a protecting resistor 5, zero-cross points of an instantaneous voltage v applied to the heat-sensitive wire 1 are detected by a zero voltage detection unit 3, and zero-cross points of a current j, flowing into the heat-sensitive wire 1 are detected by a zero current detection unit 4. Both intervals between the zero-cross points are measured by an interval measuring unit 7, and an output unit 8 outputs a temperature measurement value T obtained by converting the measurement value measured by the measuring unit 7 into a signal having a form suitable for an equipment connected to the output of the output unit 8.

The zero voltage detection unit 3 has a detection transistor 301, and the base of the transistor 301 is connected to the power source terminal of the heat-sensitive wire 1 through a resistor 303 and to a ground line through a diode 302. When the voltage v (FIG. 3(a) of the ac power source 2 is in a positive half-wave integral of the waveform period, a base current flows into the transistor 301 through the resistor 303 to turn on the transistor 301. When the voltage of the ac power source 2 is in a negative half-wave interval of the waveform period, the diode 302 is turned on, and the transistor 301 is turned off. Therefore, as shown in FIG. 3(b), a detection pulse B which is set to "0" level in a positive half-wave interval of the voltage v of the power source 2 and set to "1" level in a negative half-wave interval thereof can be obtained from the collector of the transistor 301.

Figure 3:
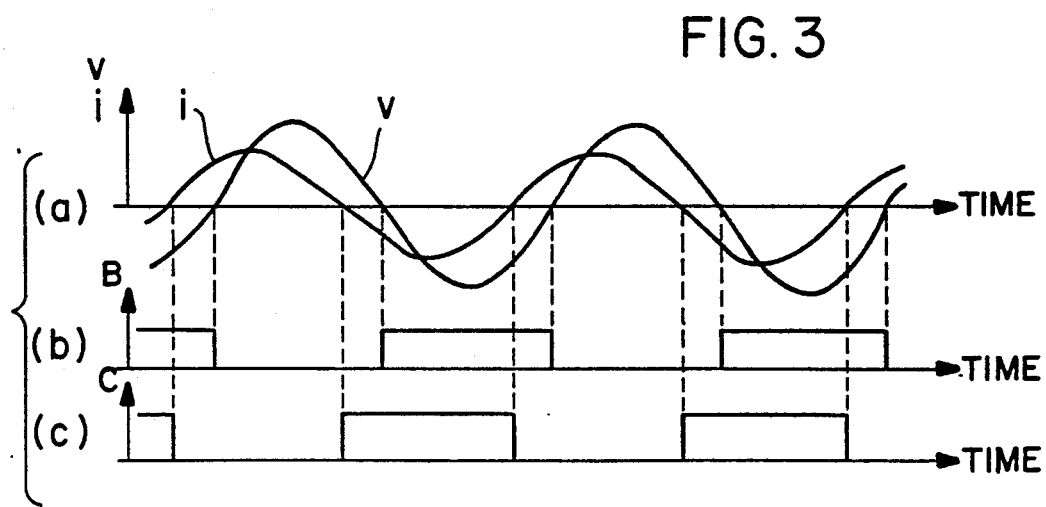
FIG. 3 is a waveform chart of an operation in the embodiment shown in FIG. 2.

The zero current detection unit 4 has the same arrangement as that of the zero voltage detection unit 3. The zero current detection unit 4 includes a detection transistor 401 which has the base connected to the ground terminal of the heat-sensitive wire 1 and which is clamped at an almost ground potential by a diode 402. This transistor 401 outputs a detection pulse C from its collector in response to the ac current i, (FIG. 3(a)) flowing into the heat-sensitive wire 1. As shown in FIG. 3 (c), the detection pulse C is set to "0" level in a positive half-wave interval of the period of the current i set to "1" level in a negative half-wave interval of the period of the current i.

The voltage of the commercial ac power source 2 is set to an effective value of several 10 to 100 V, and each of the threshold voltages of the transistors 301 and 401 and the diodes 302 and 402 is set at a dc voltage of 0.7 V or less. Therefore, when these threshold voltages are neglected, the zero-cross points of the instantaneous voltage v applied to the heat-sensitive wire 1 and the instantaneous current i flowing into the heat-sensitive wire 1 can be detected as leading and trailing edges of the collector voltages of the transistors 301 and 401.

The instantaneous voltage v and the instantaneous current j, are illustrated by the operating waveforms shown in FIG. 3. That is, in FIG. 3 (a), time is plotted in the abscissa, and the instantaneous voltage v applied to the heat-sensitive wire 1 and the instantaneous current i flowing into the heat-sensitive wire 1 are indicated. The collector voltage of the transistor 301 changed to correspond to each time is shown in FIG. 3(b), and the collector voltage of the transistor 401 is shown in FIG. 3(c). Assuming that these voltages are represented by logical values B and C, respectively, the phase angle $\phi$ corresponds to an interval in which $B \cdot \overline{C} = 1$ or $\overline{B} \cdot C = 1$ is established. In both the intervals, the diode 302 having a polarity opposite to that of the transistor 301 is connected between the base and emitter of the transistor 301, and the diode 402 having a polarity opposite to that of the transistor 401 is connected between the base and emitter of the transistor 401, thereby obtaining the instantaneous voltage v and the instantaneous current i each having symmetrical positive and negative components. In addition, each of all intervals between the zero-cross points of the instantaneous voltage v and the zero-cross points of the instantaneous current i corresponds to the phase angle $\phi$ at a ratio of 1:1. For this reason, when convenient zero-cross points are selected, and an interval between the zero-cross points is measured, the phase angle $\phi$ can be obtained.

The length of the interval can be variously measured by well-known circuit techniques. In an embodiment in FIG. 2, a NOT element 701 and an AND element 702 cause a counter 704 to count clock pulses CK generated by an oscillator 703 in only an interval in which $B \cdot \overline{C} = 1$ is established, and the counter 704 is reset in an interval of $C = 1$ or at the leading edge of the interval. With the above arrangement, the length of the interval, i.e., the phase angle $\phi$, in which $B \cdot \overline{C} = 1$ is established can be continuously measured every hertz, thereby obtaining satisfactory response in consideration of the response of the heat-sensitive wire 1.

Figure 4:
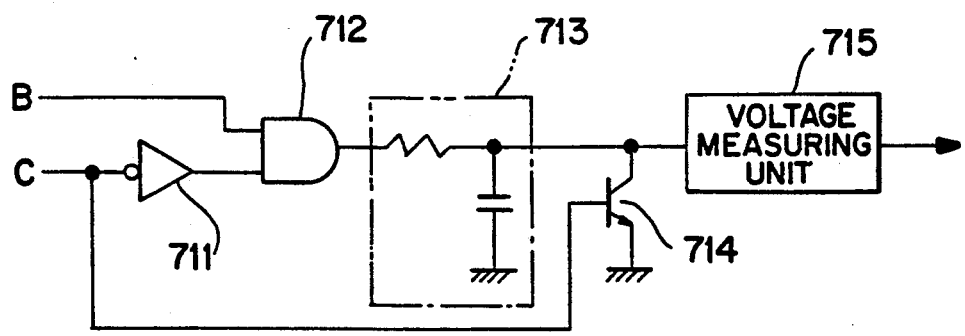
FIGS. 4 and 5 are circuit diagrams showing main parts of a temperature detector according to another embodiment of the present invention.

In another embodiment shown in FIG. 4, a NOT element 711 and an AND element 712 cause the AND element 712 to output a voltage in a period in which $B \cdot \overline{C} = 1$ is established The output voltage gas a pulse width corresponding to an interval between the zero-cross points and is integrated by an integrating circuit 713 to obtain a voltage corresponding to a size of a phase angle $\phi$. This voltage is measured by a voltage measuring unit 715 to achieve an object of the present invention. Charges accumulated in the integrating circuit 713 are discharged by a transistor 714 in a period of $C = 1$, such that the integrating circuit 713 prepares for the next measurement.

In a digital processing circuit such as a counter, a signal is generally processed as a pulse shape rather than as a change in level. When each of the signals B and C passes through a differential circuit, and then the signals are used such that the polarities of the signals are matched, the signals can be suitable for the above object.

Figure 5:
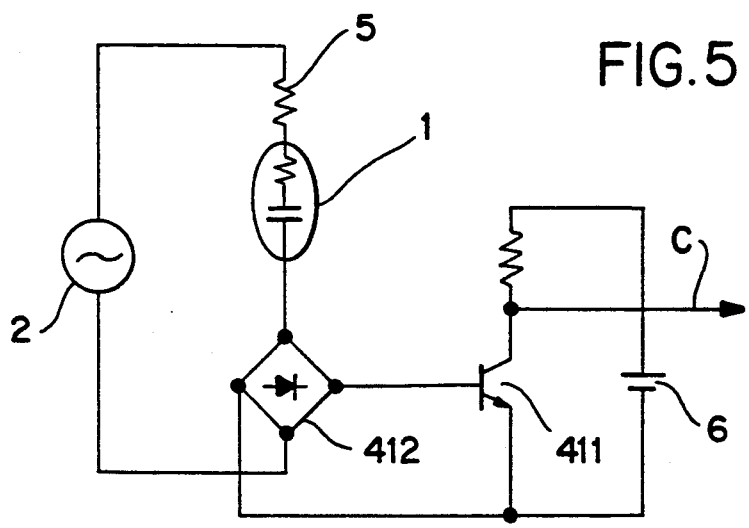

As shown in FIG. 5, a zero voltage detection unit 3 and a zero current detection unit 4 may have an arrangement in which a voltage and a current are rectified by a diode bridge 412 to be supplied to a transistor 411. In this case, since the collector voltage of the transistor 411 is obtained as a pulse waveform at a zero-cross point, a pulse processing technique is easily applied to the collector voltage. However, a power source 6 for the transistor 411 and the ground line of an ac power source 2 are not easily connected to each other.

In either case, since the heat-sensitive wire is an element having a considerably high impedance, a high input-impedance element such as a field effect transistor is preferably used as a transistor.

In addition to the above methods, as a method of measuring the phase angle $\phi$, it may be suitable that a proper level point of an instantaneous voltage or an instantaneous current, e.g., a maximum value point, is measured. However, since the heat-sensitive wire has a large number of nonlinear factors, a current flowing into the heat-sensitive wire is distorted, and the shape factor of the current is changed in accordance with a change in temperature. For this reason, when the phase angle is measured at points other than zero-cross points, an increase in error of the phase angle must be taken into consideration. This current distortion has been neglected in the above description for the sake of descriptive convenience. However, it should be understood that the current distortion has been described with reference to an equivalent sine wave.

Figure 1:
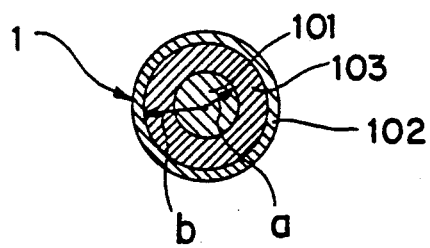
FIG. 1 is a sectional vi showing a heat-sensitive wire.
Figure 6:
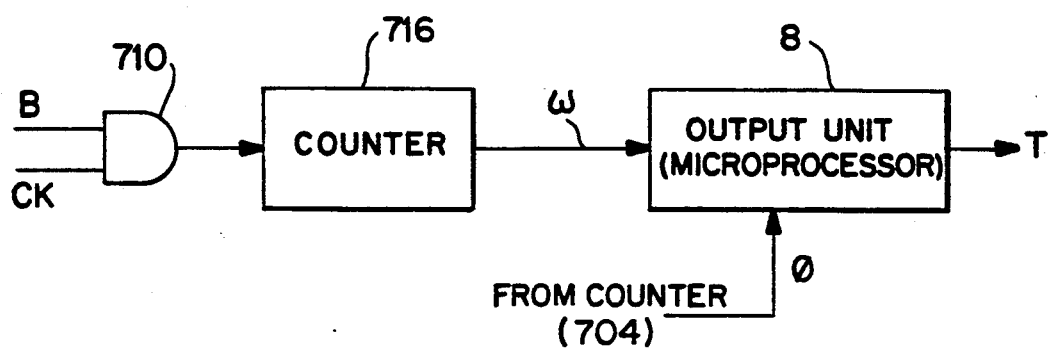
FIG. 6 is a circuit diagram showing a main part of a temperature detector when an angular frequency is added to measurement factors.

As is apparent from equation (7), when the frequency of a power source is changed, the phase angle $\phi$ is changed as a matter of course. Therefore, although the above measurement value is changed, as is illustrated in FIG. 6, the measurement value can be corrected by independently measuring the length of an interval in which the signal B or C is set to "1" level or "0" level. In FIG. 6, an AND element 710 output oscillator-clock pulses from oscillator 703 of in an interval in which a zero voltage detection pulse B is set at "1" level, and the clock pulses are counted by a counter 716, thereby obtaining data corresponding to an angular frequency $\omega$. This data is supplied together with data of a phase angle $\phi$ which represents a measurement value of the interval of the zero-cross points as described previously, to an output unit 8 constituted by, e. g. , a microprocessor or the like. The phase angle $\phi$ is output from the counter 704 shown in FIG. 1. Therefore, a temperature T (corresponding to the phase angle $\phi$) can be obtained on the basis of equation (7).

As described above, according to the present invention, zero-cross points of the instantaneous voltage v applied to the heat-sensitive wire 1 and the instantaneous current i flowing into the heat-sensitive wire 1 are detected by the zero voltage detection unit 3 and the zero current detection unit 4, respectively, intervals between the zero-cross points are measured by a zero-cross point interval measuring unit 7 to obtain a measurement value corresponding to the phase angle $\phi$. By using this method, a temperature detector capable of detecting an accurate temperature regardless of the dimensional precision of the heat-sensitive wire can be obtained.

The invention being thus described, it will be obvious that the same may be varied in many ways. Such variations are not to be regarded s a departure from the spirit and scope of the invention, and all such modifications as would be obvious to one skilled in the art are intended to be included within the scope of the following claims.

What is claimed is:

1. A temperature detector for detecting a temperature by applying an ac power source across coaxial internal and external conductors of a heat-sensitive wire, comprising:

zero voltage detecting means, parallelly connected to said heat-sensitive wire, for detecting zero-cross points of an ac voltage waveform applied across both of said coaxial internal and external conductors;

zero current detecting means, connected in series with said heat-sensitive wire, for detecting zero-cross points of an ac current waveform flowing across both of said coaxial internal and external conductors; and interval measuring means for receiving outputs from said zero voltage detecting means and said zero current detecting means to measure an interval between the zero-cross points of the ac voltage waveform and the ac current waveform, said zero current detecting means having at least the same impedances of positive and negative components of the ac current waveform to prevent generation of an unbalanced component in the ac current waveform flowing across both of said coaxial internal and external conductors, a temperature measurement value being obtained from an output of said interval measuring means.

2. The temperature detector according to claim 1, wherein a thermistor is buried between said coaxial internal and external conductors.

3. The temperature detector according to claim 2, wherein said thermistor is made of a polymer compound and said coaxial internal and external conductors are flexible.

4. The temperature detector according to claim 1, wherein said zero voltage detecting means and said zero current detecting means respectively apply an ac voltage waveform to said heat-sensitive wire and supply an ac current waveform which flows into said heat-sensitive wire as base inputs of transistors, first and second diodes each having a polarity opposite to that of a corresponding transistor respectively being connected between a base and an emitter of each of said transistors, and ON/OFF threshold levels of said transistors are set to an approximately zero voltage level and an approximately zero current level, respectively.

5. The temperature detector according to claim 1, wherein said interval measuring means comprises counter means for counting clock pulses in an interval between the zero-cross points.

6. The temperature detector according to claim 1, wherein said interval measuring means comprises an integrator for integrating a pulse having a width corresponding to the interval between the zero-cross points to form a voltage signal corresponding to a temperature.

7. The temperature detector according to claim 1, wherein said zero voltage detecting means and said zero current detecting means comprise:

a rectifier for rectifying the ac voltage waveform applied to said heat-sensitive wire and the ac current waveform flowing into said heat-sensitive wire; and a detecting transistor having ON/OFF threshold levels which are set to a zero voltage level and a zero current level.

8. The temperature detector according to claim 1, wherein said interval measuring means comprises:

measurement means for generating a measurement value corresponding to of the ac voltage waveform applied to said heat-sensitive wire and the ac current waveform flowing into said heat-sensitive wire; and calculating means for calculating a temperature measurement value on the basis of measurement values of the frequencies and a measurement value of the interval of the zero-cross points.

9. The temperature detector according to claim 1, wherein said zero voltage detecting means comprises:

a first transistor having a base coupled to the ac voltage waveform applied to said heat-sensitive wire, an ON/OFF threshold of said first transistor being set to an approximately zero voltage level; and a first diode, of polarity opposite said first transistor, coupled between the base and an emitter of said first transistor, said zero current detecting means comprises a second transistor having a base coupled to the ac current waveform flowing into said heat-sensitive wire, an ON/OFF threshold of said second transistor being set to an approximately zero current level; and a second diode, of polarity opposite said second transistor, coupled between the base and an emitter of said second transistor.

* * * * *